Jan. 4, 1955    H. W. EVANS    2,698,748
PIPE CUTTING MACHINE OF THE BLOWTORCH TYPE
Filed Aug. 27, 1953
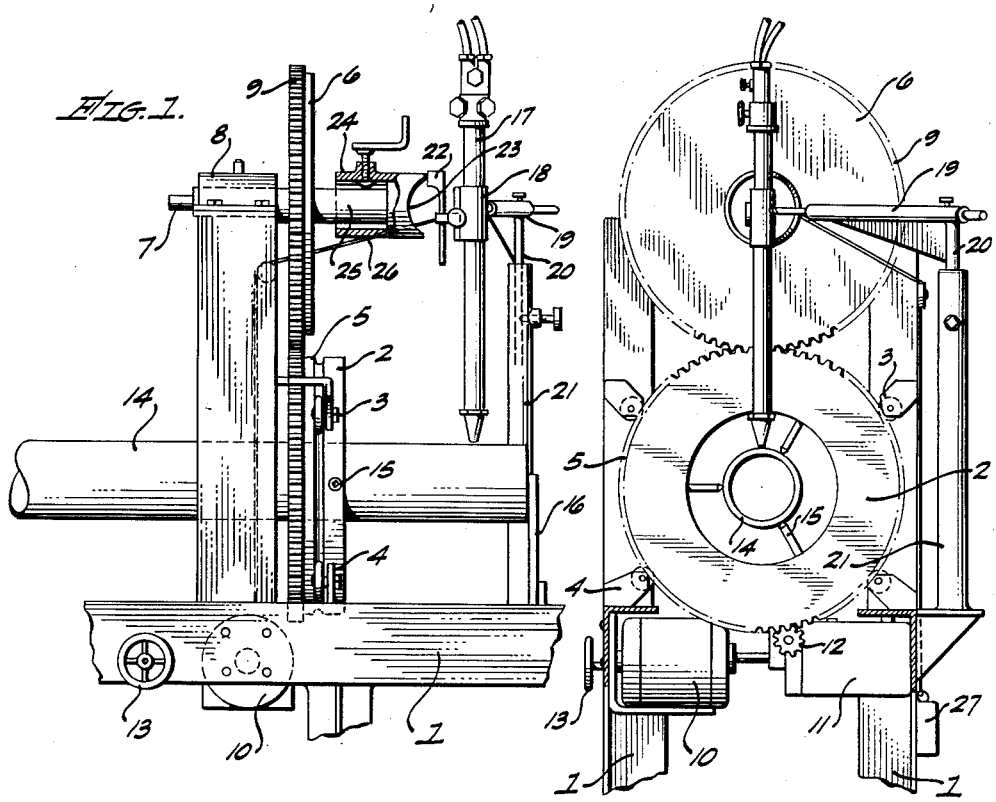
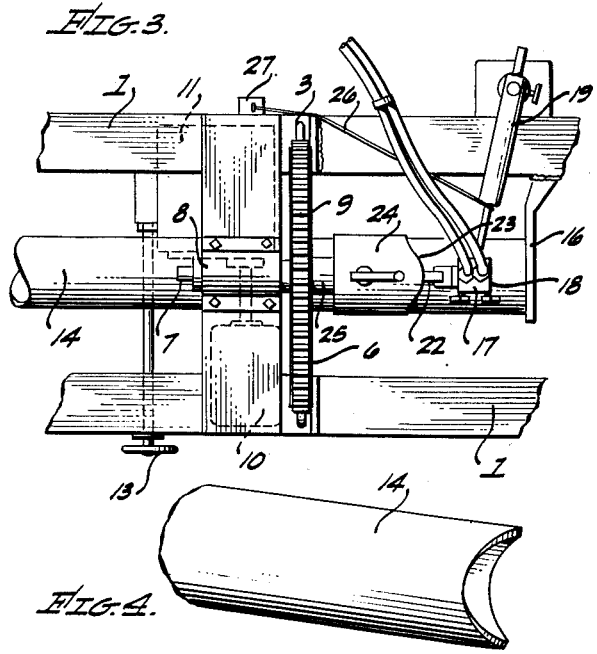
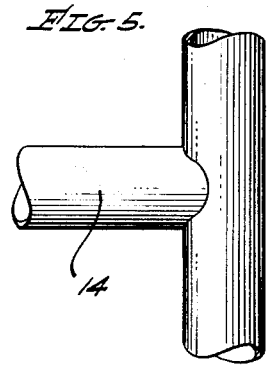
INVENTOR.
HARRY WILLIS EVANS,
BY
ATTORNEY.

United States Patent Office 2,698,748
Patented Jan. 4, 1955

2,698,748

PIPE CUTTING MACHINE OF THE BLOWTORCH TYPE

Harry Willis Evans, Anaheim, Calif.

Application August 27, 1953, Serial No. 376,887

4 Claims. (Cl. 266—23)

This invention relates to a pipe cutting machine of the pantograph type, in which a cutting torch is guided by means of a cam to cut a particular pattern on a rotating pipe.

An object of my invention is to provide a novel pipe cutting machine in which a pipe of considerable length can be mounted in the machine and rotated under a cutting torch, the torch being moved relative to the pipe by means of a rotating cam.

Another object of my invention is to provide a novel pipe cutting machine, in which the pipe which is to be cut can be rotated at various speeds to suit the requirements of the particular metal of the pipe, or the diameter thereof, or the character of the cut which is being made in the pipe.

Another object of my invention is to provide a novel pipe cutting machine of the character stated, in which the cam can be quickly and easily changed, as might be required.

Still another object is to provide a novel pipe cutting machine which is simple in construction, relatively inexpensive to manufacture, and which is effective in operation.

Other objects, advantages and features of invention may appear from the accompanying drawing, the subjoined detailed description and the appended claims.

In the drawing:

Figure 1 is a fragmentary side elevation of my pipe cutting machine.

Figure 2 is a front elevation of the same.

Figure 3 is a top plan view of the same.

Figure 4 is a perspective of a pipe after it has been cut.

Figure 5 is a fragmentary side elevation of a pipe joint formed after the pipe has been cut in my machine.

Referring more particularly to the drawing, the numeral 1 indicates a frame or bed consisting of suitable structural members required to support the machine. A chuck 2, annular in form, is mounted on the frame or bed 1 by means of a plurality of rollers 3 which engage the periphery of the chuck 2. The rollers 3 are suitably mounted on the frame 1 by means of the brackets 4. The chuck 2 is provided with a ring gear 5 thereon, this ring gear being either cut on the chuck and is thus integral, or it may consist of a band suitably attached to the chuck. A disc 6 is mounted above the chuck 2 in the following manner: A shaft 7 extends from the disc and this shaft is journaled in a bearing 8, which bearing is mounted on one of the members of the frame 1. A ring gear 9 on the disc 6 meshes with the gear 5 and thus the chuck 2 and the disc 6 will be simultaneously rotated. The method of rotating these two members is as follows:

An electric motor 10 is mounted on the frame 1 and this motor drives a gear reduction or transmission 11, and in turn a pinion gear 12. The gear 12 meshes with the ring gear 5, thus rotating the chuck 2 and the disc 6, due to the fact that the gear 9 on the disc meshes with the gear 5. The transmission 11 may be of the hydraulic type and can be adjusted as to speed by means of the hand wheel 13.

The pipe 14 which is to be cut is held in the chuck 2 by suitable jaws or by means of threaded pins 15 which extend radially through the chuck to engage the pipe. The pipe 14 is thus concentrically held in the chuck, and for production work it may be desirable to provide a stop 16 against which the pipe can butt to position the pipe ready for cutting.

A cutting torch 17 is mounted in a vertical position in front of the chuck 2 and the disc 6. The torch is held in position to cut the pipe 14 by the following construction: A clamp 18 circles the torch 17 and holds this torch in proper position relative to the pipe 14. The torch can also be raised or lowered in the clamp 18 to properly position the tip of the torch relative to the pipe. The clamp 18 is mounted on a horizontal arm 19 which, in turn, includes a vertical pivot 20 extending into a sleeve 21 and journaled in said sleeve. It will thus be evident that the arm 19 and the torch 17 will have a limited horizontal swinging movement, which is necessary in order that the torch may be caused to follow a cam surface to cut a corresponding pattern on the pipe 14. A cam follower 22 is attached to the clamp 18 and this cam follower engages and is guided by the cam surface 23 of the sleeve 24. The sleeve 24 in turn is removably mounted on a mandrel 25 which projects from the front face of the disc 6. The sleeve 24 is removable on the mandrel 25, and thus different sleeves with other shapes formed thereon can be readily placed on the mandrel, as required. The torch 17 is held with the cam follower 22 pressed against the cam 23 by a cable 26, one end of which is secured to the torch and the other end to a weight 27, thus holding the cam follower tightly against the cam 23 at all times. It will thus be evident that as the chuck 2 and the disc 6 are caused to rotate by the drive from the motor 10, that the sleeve 24 will also rotate and the cam follower 22 being pressed against the cam 23 will cause the torch 17 to move horizontally, thus cutting the same shape on the pipe 14 as the cam 23. It will be evident that pipes 14 of different diameters may be cut in my machine, and also that the speed of the cut can be varied by adjusting the transmission or drive 11.

Having described my invention, I claim:

1. A pipe cutting machine comprising a frame, a chuck journaled on the frame, a disc journaled on the frame and arranged in vertical alignment with the chuck, drive means extending to the chuck, an external gear on the chuck, a second external gear on the disc meshing with the gear on the chuck, whereby the chuck and disc are simultaneously rotated, pipe engaging means on the chuck to engage and hold the pipe, a cutting torch, mounting means for the torch to support the torch in a vertical position and adjacent the pipe, a cam sleeve on the disc, and a cam follower on said mounting means for the torch, said cam follower engaging the cam.

2. A pipe cutting machine comprising a frame, a chuck journaled on the frame, a disc journaled on the frame and arranged in vertical alignment with the chuck, drive means extending to the chuck, an external gear on the chuck, a second external gear on the disc meshing with the gear on the chuck, whereby the chuck and disc are simultaneously rotated, pipe engaging means on the chuck to engage and hold the pipe, a cutting torch, an arm, means pivotally mounting said arm, a clamp on the arm engaging the torch to support the torch adjacent the pipe, a cam on the disc, and a cam follower on said clamp, said cam follower engaging the cam.

3. A pipe cutting machine comprising a frame, a chuck journaled on the frame, a disc journaled on the frame and arranged in vertical alignment with the chuck, drive means extending to the chuck, an external gear on the chuck, a second external gear on the disc meshing with the gear on the chuck, whereby the chuck and disc are simultaneously rotated, pipe engaging means on the chuck to engage and hold the pipe, a cutting torch, an arm, means pivotally mounting said arm, a clamp on the arm engaging the torch to support the torch adjacent the pipe, a cam sleeve, means removably securing the cam sleeve on the disc, a cam follower on the clamp, said cam follower engaging the cam.

4. A pipe cutting machine comprising a frame, a chuck journaled on the frame, a disc journaled on the frame and arranged in vertical alignment with the chuck, drive means extending to the chuck, an external gear on the chuck, a second external gear on the disc meshing with the gear on the chuck, whereby the chuck and disc are simultaneously rotated, pipe engaging means on the chuck to engage and hold the pipe, a cutting torch, an arm, means pivotally mounting said arm, a clamp on the arm engaging the torch to support the torch adjacent the pipe, a cam sleeve, means removably securing the cam sleeve on the disc, a cam follower on the clamp, said cam follower engaging the cam, means yieldably pressing the cam follower against the cam to cause said torch to follow the contour of the cam.

References Cited in the file of this patent

UNITED STATES PATENTS

| | | |
|---|---|---|
| 1,542,887 | Irwin et al. | June 23, 1925 |
| 1,661,274 | Steere et al. | Mar. 6, 1928 |
| 2,057,612 | Formont | Oct. 13, 1936 |
| 2,190,360 | Howard | Feb. 13, 1940 |
| 2,413,088 | Urquhart | Dec. 24, 1946 |
| 2,460,412 | Douglass | Feb. 1, 1949 |
| 2,561,603 | Woerner | July 24, 1951 |